United States Patent [19]

Schabert et al.

[11] 4,167,087
[45] Sep. 11, 1979

[54] NUCLEAR REACTOR INSTALLATION IN UNDERGROUND CONSTRUCTION

[75] Inventors: Hans-Peter Schabert; Erich Strickroth, both of Erlangen, Fed. Rep. of Germany

[73] Assignee: Kraftwerk Union Aktiengesellschaft, Mülheim, Fed. Rep. of Germany

[21] Appl. No.: 820,350

[22] Filed: Jul. 29, 1977

[30] Foreign Application Priority Data

Jul. 30, 1976 [DE] Fed. Rep. of Germany ....... 2634355

[51] Int. Cl.² ............................................ E02D 27/00
[52] U.S. Cl. ..................................... 52/169.6; 49/40; 52/169.5; 109/1 S; 176/87; 176/DIG. 2
[58] Field of Search ................ 52/169.6, 169.5; 49/40; 61/0.5, 42; 176/DIG. 2, 87; 109/1 S

[56] References Cited

U.S. PATENT DOCUMENTS

| 2,234,380 | 3/1941 | McDermott | 61/42 |
| 2,346,196 | 4/1944 | Starret | 52/169.6 X |
| 2,459,227 | 1/1949 | Kerr | 61/0.5 X |
| 2,604,672 | 7/1952 | Mesnager | 109/1 S |
| 2,719,823 | 10/1955 | Zinn | 109/1 S |
| 3,021,273 | 2/1962 | Dix | 176/DIG. 2 |
| 3,562,953 | 2/1971 | Prickett et al. | 49/40 |
| 3,712,851 | 1/1978 | Isberg et al. | 176/87 |

FOREIGN PATENT DOCUMENTS

| 347406 | 1/1922 | Fed. Rep. of Germany | 52/169.6 |
| 1509638 | 5/1969 | Fed. Rep. of Germany | 49/40 |
| 14838 | of 1913 | United Kingdom | 52/169.6 |

OTHER PUBLICATIONS

Schweizer Bauzeitung (Swiss Construction News), Book 42, p. 627, Oct. 1958.
Chemische Rundschau (Chemical Review), No. 17, Sep. 1, 1962, pp. 482, 483.

Primary Examiner—Alfred C. Perham
Attorney, Agent, or Firm—Herbert L. Lerner

[57] ABSTRACT

Nuclear reactor installation in underground construction having a tunnel extending from a location at the surface of the earth to an underground concrete tank includes an auxiliary tunnel extending from a branching location of the first-mentioned tunnel to a location at the surface of the earth different than that from which the first-mentioned tunnel extends, the auxiliary tunnel having a cross section smaller than that of the first-mentioned tunnel and having means disposed therein for blocking the auxiliary tunnel, the blocking means being openable during operation of the nuclear reactor installation, the first-mentioned tunnel being substantially rectilinear and being continuously closed during operation of the nuclear reactor installation between the branching location thereof and the location at the surface of the earth from which the first-mentioned tunnel extends.

20 Claims, 3 Drawing Figures

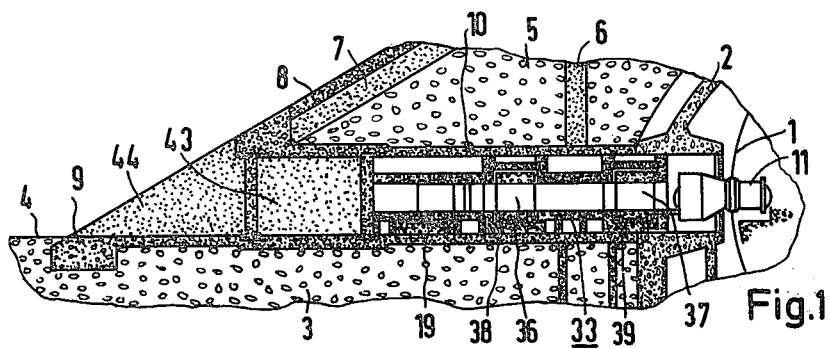
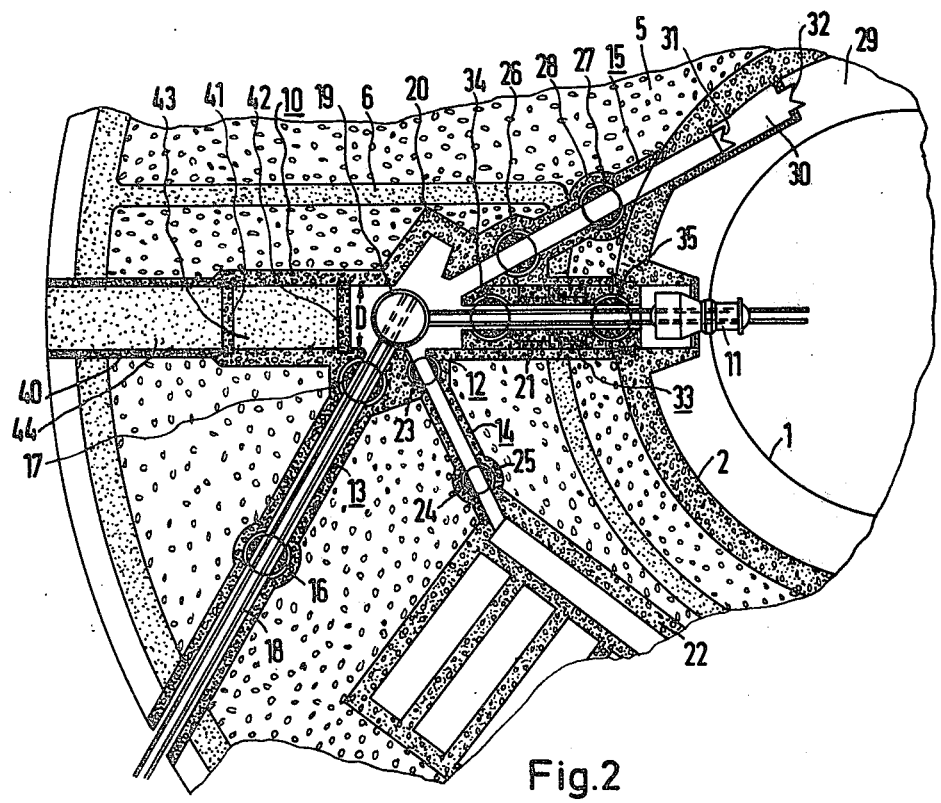

NUCLEAR REACTOR INSTALLATION IN UNDERGROUND CONSTRUCTION

The invention relates to a nuclear reactor installation in underground construction having a tunnel extending from the surface of the earth to an underground concrete tank. Such a tunnel is, in fact, not shown or described in the paper "Underground Siting of Nuclear Power Reactors", a publication prepared for the IAEA/NEA Symposium, but is, however, required therein because, otherwise, operation of the nuclear reactor installation in the concrete tank is scarcely conceivable.

The invention of this application is concerned with the construction of this tunnel. It is an object of the invention to provide a nuclear reactor installation in underground construction with such a tunnel that will, on the one hand, afford adequate accessibility to the concrete tank for operation of the nuclear reactor installation and, on the other hand, avoid undesired consequences that could result from the fact that to provide the tunnel it is necessary to produce a break in the underground construction.

With the foregoing and other object in view, there is provided, in accordance with the invention, a nuclear reactor installation in underground construction having a tunnel (main tunnel) extending from a location at the surface of the earth to an underground concrete tank comprising an auxiliary tunnel extending from a branching location of the first-mentioned tunnel to a location at the surface of the earth different than that from which the first-mentioned tunnel (main tunnel) extends, the auxiliary tunnel having a cross section smaller than that of the first-mentioned tunnel and having means disposed therein for blocking the auxiliary tunnel, the blocking means being openable during operation of the nuclear reactor installation, the first-mentioned tunnel being substantially rectilinear and being continuously closed during operation of the nuclear reactor installation between the branching location thereof and the location at the surface of the earth from which the first-mentioned tunnel extends.

For the invention of this application, during normal reactor operation, only a relatively small tunnel, which can be well protected operationally with a blocking or closing device, is provided so as to exclude virtually all influences that might be exerted through the tunnel on the reactor operation, as well as all effects that the reactor may have outside the ground. On the other hand, adequate accessibility must be provided for the situation wherein repairs or reconditioning require the transport of large components. For this situation, an operationally openable blockage is not of concern, but rather, more time can be spent therefor and no requirement exists for taking into account the possibility that radioactivity might escape, because, in such a situation, the reactor is not in operation. In accordance with another feature of the invention, the cross sections of the first-mentioned or main tunnel and the auxiliary tunnel have a ratio of at least 2:1. In actual practice, however, generally even higher ratios can be attained, such as 4:1 to 10:1, for example.

In accordance with a further feature of the invention, the blocking means comprise two separate blocking members or gates, because then a sluice or gate-like operation is possible wherein at least one of the blocking members ensures a blocking of the path between the surface of earth and the concrete vessel.

In accordance with an added feature of the invention, rails are disposed in the first-mentioned or main tunnel and in the auxiliary tunnel, and a rail turntable is provided at the branching location connecting the respective rails of the tunnels. The provision of rails in the main and auxiliary tunnels permit the transport also of heavy goods. A sluice or lock carriage is then preferably employed which has its own electric drive and permits heavy loads, such as fuel-element transport containers having a weight of 100 tons and more, to be driven through the sluice or lock which has relatively narrow or confining dimensions. The carriage is advantageously relatively short because, thereby, also the sluice or lock dimensions can be kept correspondingly small. The rail turntable affords the best space-saving possibility for forming a branch for the rails. Making the sluice or lock carriage short is also advantageous for the turntable which can accordingly be provided with a correspondingly shorter diameter.

In accordance with an added feature of the invention, at least another auxiliary tunnel extends from the first-mentioned or main tunnel at the branching location thereof. The turntable can then be used for joining several rail connections and receives structural simplifications that will be described hereinafter in greater detail.

In accordance with yet another feature of the invention, the blocking means comprise at least one body of rotation formed with a throughbore passageway and being rotatable from a position thereof wherein the throughbore passageway is aligned in direction of the auxiliary tunnel to a position thereof transversely to the direction wherein the throughbore passageway is fully covered by the walls of the auxiliary tunnel. The body of rotation is advantageously a cylinder. However, it may also be a spherical body.

In accordance with yet a further feature of the invention, the auxiliary tunnel is widened in vicinity of the blocking means. By widening or thickening the auxiliary tunnel in the vicinity of the blocking means, a constriction of the flowthrough cross section by the blocking means is avoided. In accordance with another feature of the invention, the widening of the auxiliary tunnel is symmetrical with respect to the axis of the auxiliary tunnel.

In accordance with a further feature of the invention, the blocking means comprise two sealing members located mutually spaced behind one another in the auxiliary tunnel, and means for evacuating the space between the two sealing members. Radio-activity which, for example, escapes in the form of gases or vapors from the concrete tank during a disturbance, can thereby be prevented from forcing its way through the tunnel and out of the ground. The volume evacuated is advantageously pumped back into the part of the tunnel returning to the concrete tank. Filtering equipment can also be provided to render the evacuated gas or vapor activity-free so that it can be released to the outside.

In accordance with an added feature of the invention, the concrete tank is axially symmetrical, and including another auxiliary tunnel extending from the first-mentioned tunnel at the branching location thereof and being disposed substantially tangentially to the concrete tank and terminating therein.

In accordance with an additional feature of the invention, the nuclear reaction installation includes a preferably spherical containment received in the concrete tank and defining therewith an annular space, the auxiliary tunnel terminating in the annular space.

In accordance with an improved structural feature of the invention, at least one of the tunnels has walls formed of concrete pipe sections floatingly disposed with elastic joint seals in the earth. The concrete pipe sections are at least so pressure-tight that they are reliably undisturbed by loads or stresses exerted by the earth. In addition, regions of the tunnels located between the concrete tank and the first blocking device facing toward the concrete tank can be especially reinforced so that they can also withstand an overpressure or excess pressure that could be exerted when vapor or gas were to escape from the concrete tank.

The elastic joint seals can be constructed in the form of bellows made of rubber or synthetic material. They can also, for example, be provided by sealing compounds known from the construction of sewage channels or conduit which, in any event, offer such wide-reaching flexibility or mobility that earthquakes, which can be produced, for example, by the settling of the earth, are yieldingly absorbed without excess stress.

In accordance with yet another feature of the invention, the tunnels are located above the water table of the earth. Accordingly, even upon the failure of the aforementioned seals, no disturbances need be feared. In accordance with other features of the invention, the tunnesl are disposed on an original surface level of the earth, a hill is piled up to cover the tunnels and the original surface. In forming the hill, the branching location is covered by a layer of earth having a thickness equal to at least the diameter of the first-mentioned or main tunnel. To maintain, as long as possible, the reliability of the enclosure formed by the fill for the radioactivity present in the nuclear reactor installation, there is provided, in accordance with a further feature of the invention, a nuclear reactor installation wherein the concrete tank is axially symmetrical, and which includes another auxiliary tunnel extending from the first-mentioned or main tunnel at the branching location thereof and being disposed substantially tangentially to the concrete tank and terminating therein, the other auxiliary tunnel having blocking means similar to the first-mentioned blocking means, the first-mentioned and the auxiliary tunnels being disposed on an original surface level of the earth, the hill covering the tunnels and the original surface and being formed with a partition consisting of water-impermeable material, especially clay, extending transversely to the other auxiliaty tunnel in vicinity of the blocking means thereof. In nuclear reactor installations having several such partitions connected behind one another, a blocking device can be provided in vicinity of each of the partitions. It can also be advantageous to provide a blocking device on both sides of each partition.

In accordance with yet another feature of the invention, a pipeline extends through the auxiliary tunnel, a transverse wall is fixed at a location in the auxiliary tunnel and holds the pipeline, and blocking means are provided in the auxiliary tunnel at the location for blocking the remaining open cross section of the auxiliary tunnel at the transverse wall. This is an especially important feature of the invention and offers many advantages, under certain conditions, independently of the construction of the main tunnel. Such auxiliary tunnels would be provided especially if the energy present in the concrete tank, for example, in the form of vapor or steam, is conducted to a location outside the concrete tank, for example, to a machinery building for producing electrical energy. The pipelines are then live steam lines or feedwater lines under great pressure, such as 80 bar, for example. It is therefore important that the operational reliability be capable of being controlled by tests and examinations. The tunnel ensures the accessibility to the pipelines, the fixed transverse wall holding the line fast so that also in the event of a line break, no undue movements occur. Moreover, in accordance with yet a further feature of the invention, the pipeline has a double wall to prevent damage to the tunnel due to an inner overpressure in the event of a break in the line.

The blocking means permits the piling up of gravel which is important for the enclosure. The regions of the tunnel at which the blocking means are located, can also therefore be thickened or enlarged. For this purpose, a one-sided construction is recommended as described hereinafter with respect to an embodiment of the invention.

As mentioned hereinbefore, the main tunnel is necessary only if large components have to be replaced for repair or reconditioning. It may therefore be advantageous, in accordance with a comcomitant feature of the invention, removable inserts are received in the first-mentioned or main tunnel for narrowing the cross section thereof so that it substantially matches the cross section of the auxiliary tunnel. With these inserts, which can be in the form of concrete members, for example, reinforcement of the main tunnel may be achieved simultaneously, which increases the reliability and safety thereof. The instant application is being filed simultaneously with three applications of one of the inventors of the instant application, namely, application Ser. Nos. 820,117, 820,257 and 820,352 of H. Schabert, and is assigned to the same assignee as that of the just-mentioned three applications. Reference may accordingly be had to any of the just-mentioned three applications for greater detail of features mentioned in the instant application and common to any of the just-mentioned co-pending three applications.

Although the invention is illustrated and described herein as embodied in nuclear reactor installation in underground construction, it is nevertheless not intended to be limited to the details shown, since various modifications and structural changes may be made therein without departing from the spirit of the invention and within the scope and range of equivalents of the claims.

The construction and method of the invention, however, together with additional objects and advantages thereof will be best understood from the following description of specific embodiments when read in connection with the accompanying drawings, in which:

FIG. 1 is a fragmentary vertical sectional view of a nuclear reactor installation of the hill construction type in accordance with the invention;

FIG. 2 is a fragmentary horizontal sectional view of the installation corresponding to the vertical view of FIG. 1.

Figure 3:
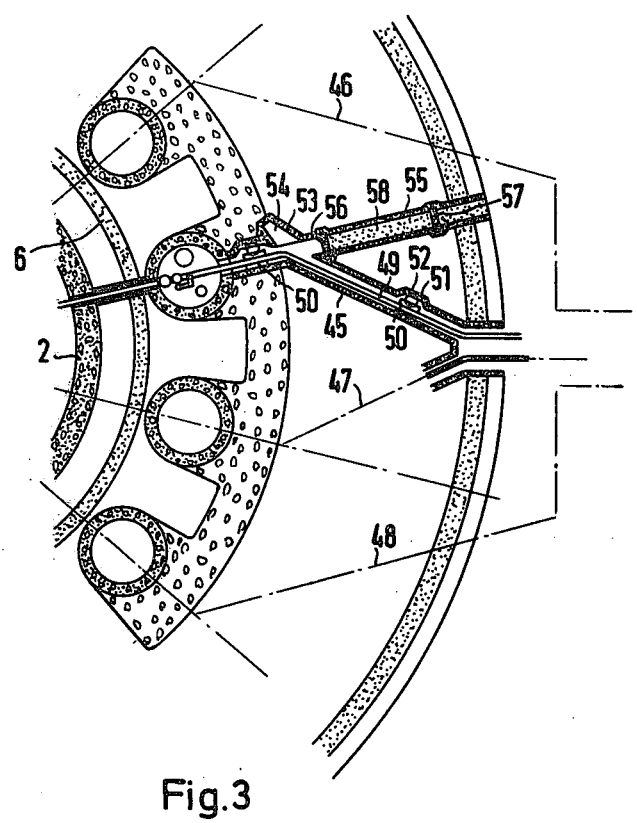
FIG. 3 is a fragmentary horizontal sectional view of the installation showing a different portion thereof than that shown in FIG. 2.

The illustrated nuclear reactor installation includes a pressurized water reactor. The specific construction of the reactor is of no importance with respect to the invention of the instant application; on the contrary, the invention is suited also for other reactors as well as for nuclear engineering installations that are concerned, for example, with the make-ready or storage of reactor fuel elements and the like.

Referring now specifically to the drawing and first, particularly, to FIG. 1 thereof, there is shown a spherical containment 1 which contains an otherwise non-illustrated pressurized water reactor and the primary components thereof, as indicated, for example, in the Kraftwerk Union A.G. (KWU) brochure "Pressurized Water Reactor" of August 1975, Order No. 295. The containment sphere 1 is surrounded by a concrete tank 2 which corresponds to the secondary shielding according to the aforementioned published brochure. The concrete tank 2 is partly embedded in the ground 3 below the normal relatively flat level 4 of the earth. A hill 5 formed of a pile of gravel covers the concrete tank 2 by a height of several meters, for example 20 m. Water-tight partitions 6 are provided in the piled-up hill 5 and are formed just like a cover layer 7 applied to the upper side of the hill 5, of water-impermeable material, preferably clay. The upper side of the hill is formed of a mechanically sturdy layer 8 formed, for example, of concrete which should provide a mechanical protection for the layer 7 and is anchored in the ground 3 to a foundation ring 9.

The concrete tank 2 is connected to the surface of the hill 5 by a rectilinear main tunnel 10, the circular cross section of which has a diameter D of 9 m. The main tunnel 10 extends radially to the concrete tank 2, in the horizontal sectional view of FIG. 2, to a so-called material sluice or lock unit 11 which is seated in the wall of the spherical containment 1. Approximately in the middle of the main tunnel 10, a branching location 12 is provided. The main tunnel 10 is connected thereat to three auxiliary tunnels 13, 14 and 15. All of the tunnels 10, 13, 14 and 15 are disposed at the original ground level 4 as it was before the hill 5 was heaped up.

The auxiliary tunnels 13, 14 and 15 have a rectangular cross section which matches the inner measurement of the material sluice or lock 11. The cross section is considerably smaller, however, than that of the main tunnel 10 and, in fact, the inner measurement of the auxiliary tunnels 13 and 15 is 3 m×3 m, so that a cross sectional ratio of 1:7 with respect to the main tunnel 10 is produced. The auxiliary tunnel 14 has an inner measurement of 2 m×1 m and thereby a cross-sectional ratio of 1:32 with respect to the main tunnel 10.

The auxiliary tunnel 13 extends from the branching location 12 at an inclination to the edge of the hill 5 so that it terminates near the main tunnel 10 at the earth's surface 4. It contains two blocking devices 16 and 17 which are cylindrical solids or bodies of rotation as is described in greater detail hereinafter. Sliding doors could, however, also be used. In the auxiliary tunnel 13, rails 18 are disposed. They lead to a turntable 19 in the branching location. In an extension to the length of the auxiliary tunnel 13, a so-called firing niche 20 is provided in the branching location with which, through the auxiliary tunnel 13 after destruction of the blocking devices 16 and 17, penetrating projectiles are captured in the branching location 12 so that they cannot have any effect in the auxiliary tunnels 14 and 15 or in the part 21 of the main tunnel 10 lying between the branching location 12 and the concrete tank 2.

The auxiliary tunnel 14 extends to a so-called emergency building 22 wherein, for example, the emergency diesel sets for emergency operation are housed. The auxiliary tunnel 14 is likewise furnished with two blocking devices 23 and 24. Of these, the blocking device 23, just as the blocking device 17, is incorporated into the structure of the branching location 12, while the blocking device 24 is disposed in a symmetric thickened portion or enlargement 25 of the tunnel wall.

The auxiliary tunnel 15 likewise contains two blocking devices 26 and 27. The blocking device 26 is seated in the structure of the branching location 12. For the blocking device 27, a symmetric beefed-up portion or enlargement 28 of the width of the tunnel wall is provided.

The auxiliary tunnel 15 extends, as is readily apparent in FIG. 2, nearly tangentially into an annular space 29 between the concrete tank 2 and the containment 1. At the inner end of the auxiliary tunnel 15, a sluice or lock chamber 30 with two sluice gates 31 and 32 is provided. It is possible thereby to introduce also relatively bulky and primarily long transport goods, such as, for example, heat exchangers that are 8 m long, into the concrete tank 2 without having to change the otherwise required dimensions of the containment 1 and concrete tank 2.

In the part 21 of the main tunnel 10, the original tunnel cross section with the diameter D is reduced in size through removable inserts which are represented in their entirety by the reference numeral 33. The shape of the inserts which are to be seen in detail in FIGS. 1 and 2, produces an inner diameter of 3 m×3 m corresponding to the tunnel 13. The part of the tunnel reduced in size contains rails which extend through the sluice or locks 11.

In the course or train of the inserts 33, two blocking devices 34 and 35 are also disposed. The cylindrical bodies thereof formed with through bores 36 and 37 are braced with rollers on a rail ring 38 and 39, respectively, so that they can be turned readily through 90°. In this non-illustrated position, the passage through the constructed main tunnel part 21 is blocked. In a similar manner, a blockage by the other blocking devices 16, 17; 23, 24 and 26, 27 is possible.

The outer part 40 of the main tunnel 10 lying between the branching location 12 and the hill surface, is normally closed. For this purpose, two concrete plates or slabs 41 and 42 are introduced into the tunnel walls. The intermediate space 43 and the region 44 extending to the outside are filled additionally with gas- and water-impermeable material, for example, with clay. A blockage is thereby formed which is not openable during operation. For the case where repairs are to be made, wherein large components, for example, complete steam generators, are to be exchanged, the possibility still exists, nevertheless, after shutting down the reactor, of opening the main-tunnel region 40, so that after removal of the inserts 33, the aforementioned large components can be transported.

Besides the tunnels 10, 13, 14 and 15 serving as access, four additional tunnels for lines between the concrete tank 2 and a non-illustrated machinery building are also provided. Of these, the one tunnel 45 is completely shown in FIG. 3 whereas the tunnels 46, 47 and 48, which are built in the same manner, are indicated only by the axes thereof shown in dot-dash lines. The lines 49 in the tunnels 45 to 48 are primarily the live steam lines and the feedwater lines for the secondary circulatory loop of the pressurized water reactor. What are involved are thus pressure-conducting lines which must be especially protected. Furthermore, these lines should be accessible for the purpose of control. They can also be provided with double-walled pipes. The tunnels 45 to 48 are preponderantly constructed as cylindrical concrete pipes. They contain, however, firm transverse walls 50 which enclose the lines 49 and form a baffle in the course of the tunnel 45 with which the tunnel cross section is protected against penetration by fragments or projectiles. In the course of the transverse walls 50, of which, in the embodiment of the invention, two thereof are disposed in staggered arrangement behind one another, the tunnel wall is widened at 51 to provide space for a blocking or locking device 52 which is constructed like the herinaforedescribed blocking devices though having somewhat smaller dimensions.

FIG. 3 additionally shows that the tunnels 45 to 48 are constructed angularly. In the vertex 53 of the angle, a projection 54 is disposed in the course of the part extending toward the outside and serves for intercepting parts which might penetrate through the outer channel part.

In FIG. 3, there is shown that the tunnels 45 to 48 have a rectilinear part 55 in addition to the angularly disposed course, the rectilinear part 55 being blocked by concrete plates or slabs 56, 57 and a filling charge of clay 58. This rectilinear part 55 serves only for the construction of the installation and the assembly of the line elements. It is also by all means conceivable that one can dispense with such a rectilinear part 55.

There are claimed:

1. Nuclear reactor installation in underground construction having a tunnel extending from a location at the surface of the earth to an underground concrete tank comprising an auxiliary tunnel extending from a branching location of the first-mentioned tunnel to a location at the surface of the earth different than that from which the first-mentioned tunnel extends, said auxiliary tunnel having a cross section smaller than that of the first-mentioned tunnel and having means disposed therein for blocking said auxiliary tunnel, said blocking means being openable during operation of the nuclear reactor installation, said first-mentioned tunnel being substantially rectilinear and being continuously closed during operation of the nuclear reactor installation between said branching location thereof and the location at the surface of the earth from which said first-mentioned tunnel extends.

2. Nuclear reactor installation according to claim 1 wherein the cross sections of said first-mentioned tunnel and said auxiliary tunnel have a ratio of at least 2:1.

3. Nuclear reactor installation according to claim 1 wherein said blocking means comprise two separate blocking members.

4. Nuclear reactor installation according to claim 1 including rails disposed in said first-mentioned tunnel and in said auxiliary tunnel, and including a rail turntable at said branching location connecting the respective rails of said tunnels.

5. Nuclear reactor installation according to claim 1 including at least another auxiliary tunnel extending from said first-mentioned tunnel at said branching location thereof.

6. Nuclear reactor installation according to claim 1 wherein said blocking means comprise at least one body of rotation formed with a throughbore passageway and being rotatable from a position thereof wherein the throughbore passageway is aligned in direction of said auxiliary tunnel to a position thereof transversely to said direction wherein said throughbore passageway is fully covered by the walls of said auxiliary tunnel.

7. Nuclear reactor installation according to claim 6 wherein said auxiliary tunnel is widened in vicinity of said blocking means.

8. Nuclear reactor installation according to claim 7 wherein the widening of said auxiliary tunnel is symmetrical with respect to the axis of said auxiliary tunnel.

9. Nuclea reactor installation according to claim 1 wherein said blocking means comprise two sealing members located mutually spaced behind one another in said auxiliary tunnel, and means for evacuating the space between said two sealing members.

10. Nuclea reactor installation according to claim 1 wherein the concrete tank is axially symmetrical, and including another auxiliary tunnel extending from said first-mentioned tunnel at said branching location thereof and being disposed substantially tangentially to the concrete tank and terminating therein.

11. Nuclear reactor installation according to claim 10 including a containment received in the concrete tank and defining therewith an annular space, said auxiliary tunnel terminating in said annular space.

12. Nuclear reactor installation according to claim 1 wherein at least one of said tunnels has walls formed of concrete pipe sections floatingly disposed with elastic joint seals in the earth.

13. Nuclear reactor installation according to claim 1 wherein said tunnels are located above the water table of the earth.

14. Nuclear reactor installation according to claim 1 wherein said tunnels are disposed on an original surface level of the earth, and including a hill covering said tunnels and the original surface.

15. Nuclear reactor installation according to claim 14 wherein said branching location is covered by a layer of earth having a thickness equal to at least the diameter of said first-mentioned tunnel.

16. Nuclear reactor installation according to claim 1 wherein the concrete tank is axially symmetrical, and including another auxiliary tunnel extending from said first-mentioned tunnel at said branching location thereof and being disposed substantially tangentially to the concrete tank and terminating therein, said other auxiliary tunnel having blocking means similar to first-mentioned blocking means, said first-mentioned and said auxiliary tunnels being disposed on an original surface level of the earth, and including a hill covering said tunnels and the original surface, the hill being formed with a partition consisting of water-impermeable material extending transversely to said other auxiliary tunnel in vicinity of said blocking means thereof.

17. Nuclear reactor installation according to claim 16 wherein said water-impermeable material is clay.

18. Nuclear reactor installation according to claim 1 including a pipeline extending through said auxiliary tunnel, a transverse wall fixed at a location in said auxiliary tunnel and holding said pipeline, and blocking means in said auxiliary tunnel at said location for blocking the remaining open cross section of said auxiliary tunnel at said transverse wall.

19. Nuclear reactor installation according to claim 1 including a pipeline extending through said auxiliary tunnel, said pipeline having a double wall.

20. Nuclear reactor installation according to claim 1 including removable inserts received in said first-mentioned tunnel for narrowing the cross section thereof so that it substantially matches the cross section of said auxiliary tunnel.

* * * * *